United States Patent [19]
Coventry

[11] Patent Number: 5,415,324
[45] Date of Patent: May 16, 1995

[54] LUBRICANT DISPENSER

[76] Inventor: William G. H. Coventry, Compressor and Engine Controls, Abbey Mill, Abbey Village, Chorley, Lancashire, United Kingdom, PR6 8DN

[21] Appl. No.: 122,421

[22] PCT Filed: Mar. 23, 1992

[86] PCT No.: PCT/GB92/00534
§ 371 Date: Sep. 23, 1993
§ 102(e) Date: Nov. 23, 1993

[87] PCT Pub. No.: WO92/16451
PCT Pub. Date: Oct. 1, 1992

[30] Foreign Application Priority Data
Mar. 23, 1991 [GB] United Kingdom ............... 9106251

[51] Int. Cl.6 .............................................. B67D 5/08
[52] U.S. Cl. .................................... 222/63; 222/333
[58] Field of Search ................... 222/63, 26, 135, 156, 222/185, 325, 333, 330, 23; 184/61; 141/18, 319, 346

[56] References Cited

U.S. PATENT DOCUMENTS

| Re. 32,593 | 2/1988 | Matsumoto | 184/103.1 |
|---|---|---|---|
| 2,203,710 | 6/1940 | Young | 222/82 |
| 2,719,654 | 10/1955 | Weatherbie | 222/263 |
| 3,280,941 | 10/1966 | Fischer | 184/6 |
| 4,880,144 | 11/1989 | Shea | 222/173 |
| 4,921,126 | 5/1990 | Waltke et al. | 220/855 |
| 5,086,950 | 2/1992 | Crossdale et al. | 222/185 |
| 5,116,580 | 5/1992 | Wilson | 222/185 |
| 5,156,308 | 10/1992 | Aoyama | 222/325 |
| 5,219,040 | 6/1993 | Meuer et al. | 222/325 |
| 5,228,594 | 7/1993 | Aslin | 22/63 |

FOREIGN PATENT DOCUMENTS 1437723 3/1966 France .
9012900 11/1990 Germany .

Primary Examiner—Andres Kashnikow
Assistant Examiner—Philippe Derakshani
Attorney, Agent, or Firm—Oliff & Berridge

[57] ABSTRACT

A lubricant dispenser, particularly for dispensing lubricants in the drawing of tubes or bars, comprises a reservoir permanently connected to one or more lubricant pumps. The pumps can be permanently connected by flexible hoses or the pumps can be permanently immersed in lubricant via a reservoir.

10 Claims, 5 Drawing Sheets

LUBRICANT DISPENSER

This invention relates to a lubricant dispenser.

In particular the present invention is concerned with a single shot lubricant dispenser in which pre-determined quantities of high viscosity lubricant can be dispensed to the outer diameter and, or inner diameters of tubing during a tube drawing process, and the outer diameter of a bar during a bar drawing process.

A known form of lubricant dispenser for this purpose comprises at least one pump and an internal level gauge, connected to a container of lubricant by means of flexible hoses and quick release connectors. The lubricant container usually comprises a standard 40 gallon barrel which has to be maneuvred so that it is supported in an inverted position on the lubricant dispenser. It is then necessary to connect the or each pump hose to the barrel. Also the lubricant dispenser always has an internal level gauge which also has to be connected to the lubricant barrel by means of a flexible hose and quick release connector.

It has been found in use that when the pump and sight level gauge hoses are connected to the lubricant barrel, personnel sometimes tip the barrel in order to gain access for making the necessary connections. This practice can result in serious injury to personnel should the barrel slip or fall.

Also as both of the hoses and in particular the pump hose are exposed to atmosphere it is possible that air will become trapped in the hoses when the hoses are connected to the lubricant barrel.

It is most important to exclude air from the pump since the presence of air in the pump can cause cavitation during operation and therefore serious damage to the pump components.

The present invention seeks to provide a lubricant dispenser in which the difficulties of connecting the lubricant barrel to the pump and the sight level gauge and also the risk of air entering the pump is minimised or avoided altogether.

Accordingly in one aspect, the present invention provides a lubricant dispenser comprising a reservoir arranged to receive a supply of lubricant, pumping means having an inlet permanently connected to the lubricant reservoir, and control means for the pumping means, the pumping means being arranged to deliver predetermined quantities of lubricant under the control of the control means; the reservoir being an integral reservoir which is permanently connected to the pumping means and which is connectable to a lubricant container by means of a flexible hose and a two-part connector, one part of which is attached to the lubricant container and extends through an opening in a support of the lubricant dispenser and the other part of which is attached to the hose which is greater in size than the opening in the plate on the dispenser.

The reservoir can be fed by gravity from a lubricant barrel which is supported in an inverted position on the lubricant dispenser.

The reservoir can be divided into at least two sub-compartments, each sub-compartment being permanently connected to a pump, and each pump can comprise an electrically driven gear pump.

The lubricant dispenser includes an internal level gauge which is permanently connected to the reservoir of the dispenser.

The lubricant dispenser can also include a pressure switch which is operated by pressure in a tube when the lubricant level reaches a low and/or empty level, the pressure switch operating indicator lights on a control panel.

In a further arrangement, the dispenser can include one or more pumps which are permanently immersed in the lubricant. Any number of such pumps can be provided, so far as space allows, and each pump can be controlled separately so as to supply lubricant to operations at spaced apart locations, simultaneously.

The pumps can be of the same size or can vary in size depending upon the needs of the operation requiring lubrication.

The present invention will be more particularly described with reference to the accompanying drawings in which.

Figure 1:
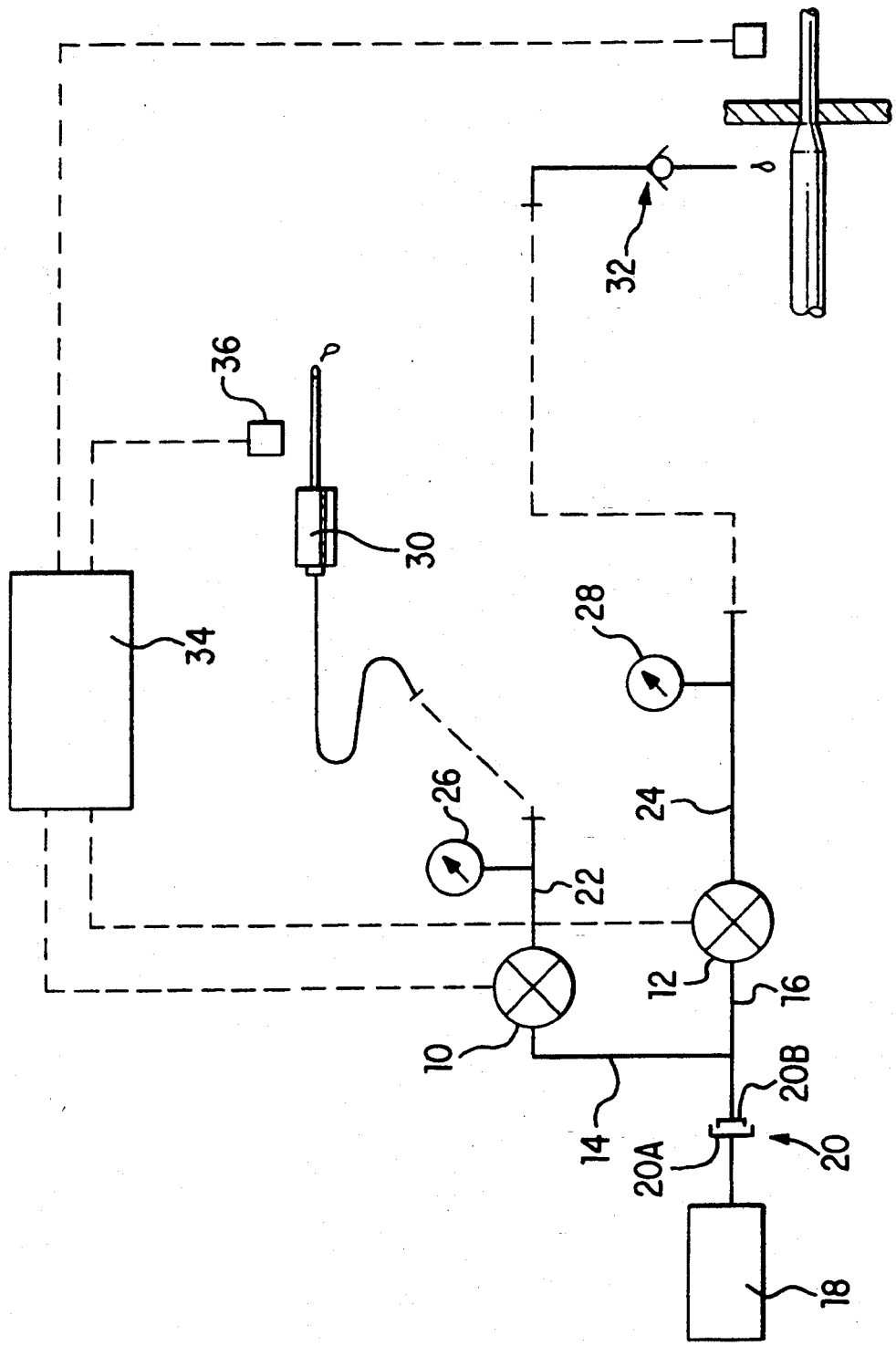
FIG. 1 shows a diagrammatic lay out of a single shot lubrication system.

Referring to FIG. 1 a single shot lubrication system comprises two gear pumps (10) and (12) driven by electric motors (not shown), the pumps (10) and (12) having inlet hoses (14) and (16) which are connected to a drum of lubricant (18) by means of a quick release coupling (20) consisting of male and female components (20A) and (20B).

The pumps (10) and (12) each have delivery tubes (22) and (24) provided with pressure gauges (26) and (28). The tube (22) is connected to dispensing lance (30) and the tube (24) terminates in a check valve (32).

Lubricant is dispensed from the lance (30) to the internal diameter of a tube being drawn whilst lubricant is dispensed from the valve (32) to the outside diameter of the tube or bar being drawn.

The pumps (10) and (12) are under the control of a control apparatus (34) which causes the pumps (10) and (12) to function, and to dispense pre-determined quantities of lubricant under the control of an operator either using a foot switch or push button (36).

Figure 2:
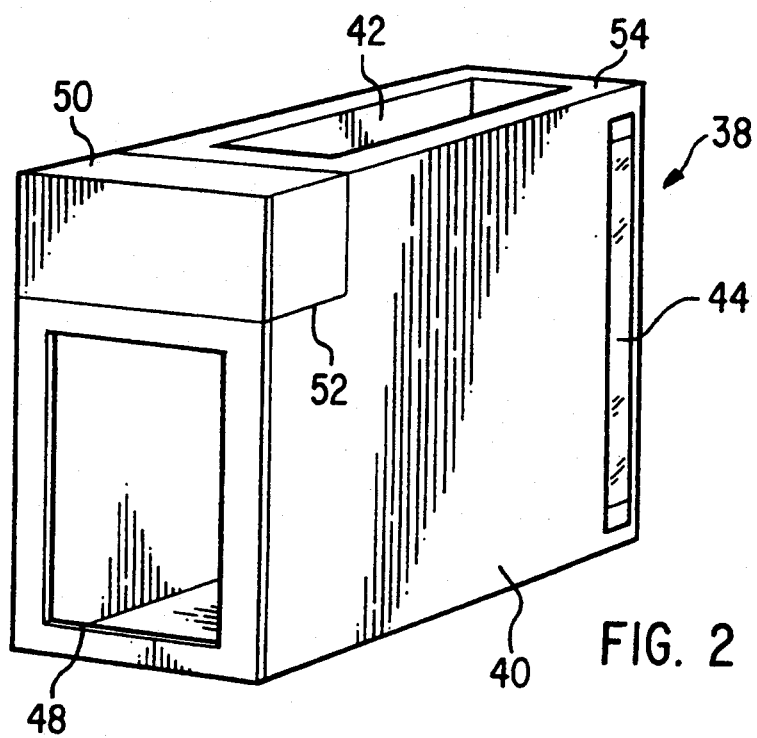
FIG. 2 shows a perspective view of one form of lubricant dispenser according to the present invention for use with the lubrication system shown in FIG. 1.
Figure 3:
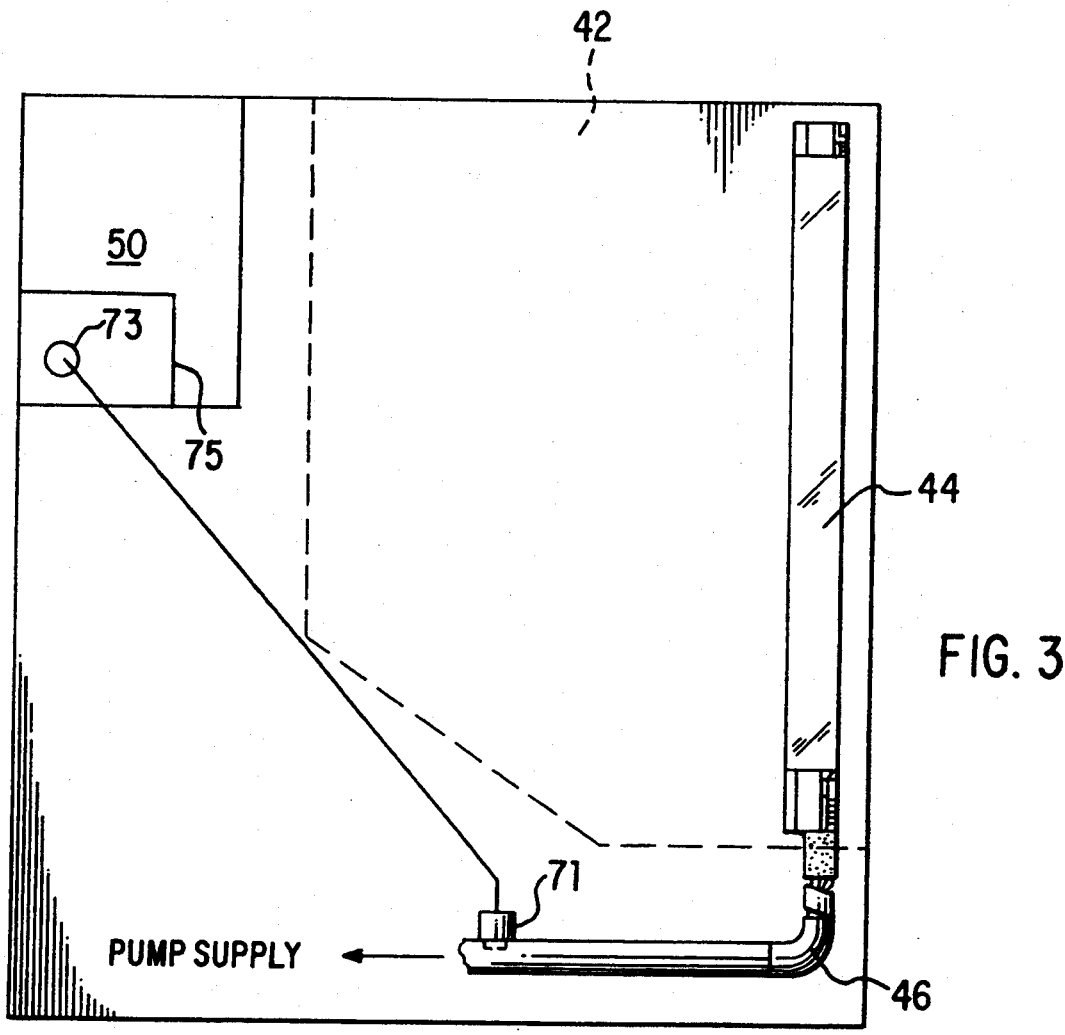
FIG. 3 shows a side elevation of the lubricant dispenser shown in FIG. 2 to an enlarged scale.

Referring to FIGS. 2 and 3, a lubricant dispenser (38) comprises a housing (40) having an integral tank or reservoir (42) which is permanently connected to a sight level gauge (44) and to a pump (not shown) by a pipe (46). The pump is located within a space (48) at the front of the lubricant dispenser (38) and a control apparatus (50) is secured on a shelf (52).

The tank (42) is provided with lubricant by inverting a barrel of lubricant and resting the barrel on a rim (54) of the integral tank (42).

The barrel is provided with a valve which is opened and lubricant fills the tank (42) by gravity. Depending on the capacity of the tank (42), a further barrel can be inverted, and its contents dispensed into the tank. When the tank (42) is full a further barrel can be inverted and rested on the rim (54), ready to be dispensed when the contents of the integral tank (42) reach a pre-determined level.

It will be appreciated that in the case of the lubricant dispenser illustrated in FIGS. 2 and 3 it is not necessary for any hose connections to be made between the lubricant barrel and the pump and sight level glass when the lubricant container is positioned on the dispenser. Also once the pump has been primed air can be prevented from entering the pump by ensuring that a fresh supply of lubricant is provided before the lubricant level in the tank reaches the level of the intake of the hose (46).

As shown in FIG. 3, a pressure switch (71) operates an indicator light (73) of a control panel (75) when the lubricant level reaches a predetermined level.

More than one pump can be permanently attached to the integral tank (42) so that lubrication can be dispensed to the inner and outer diameter of a tube being drawn.

Figure 4:
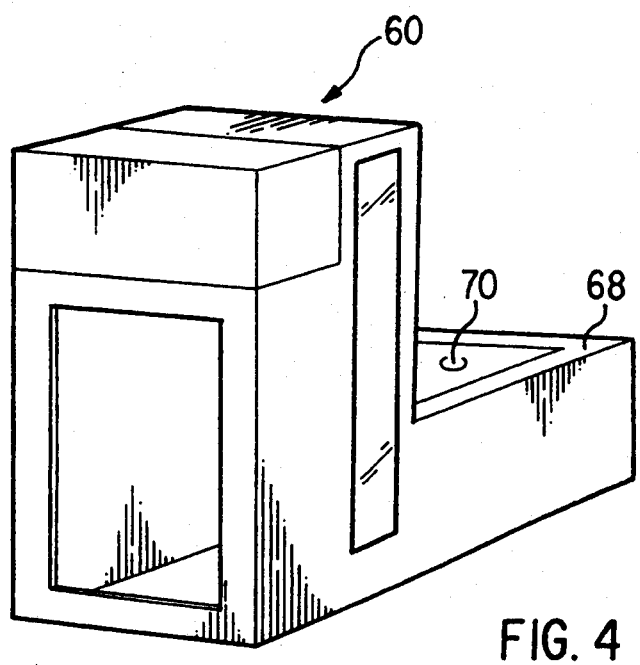
FIG. 4 shows an alternative form of lubricant dispenser to that shown in FIGS. 2 and 3.
Figure 5:
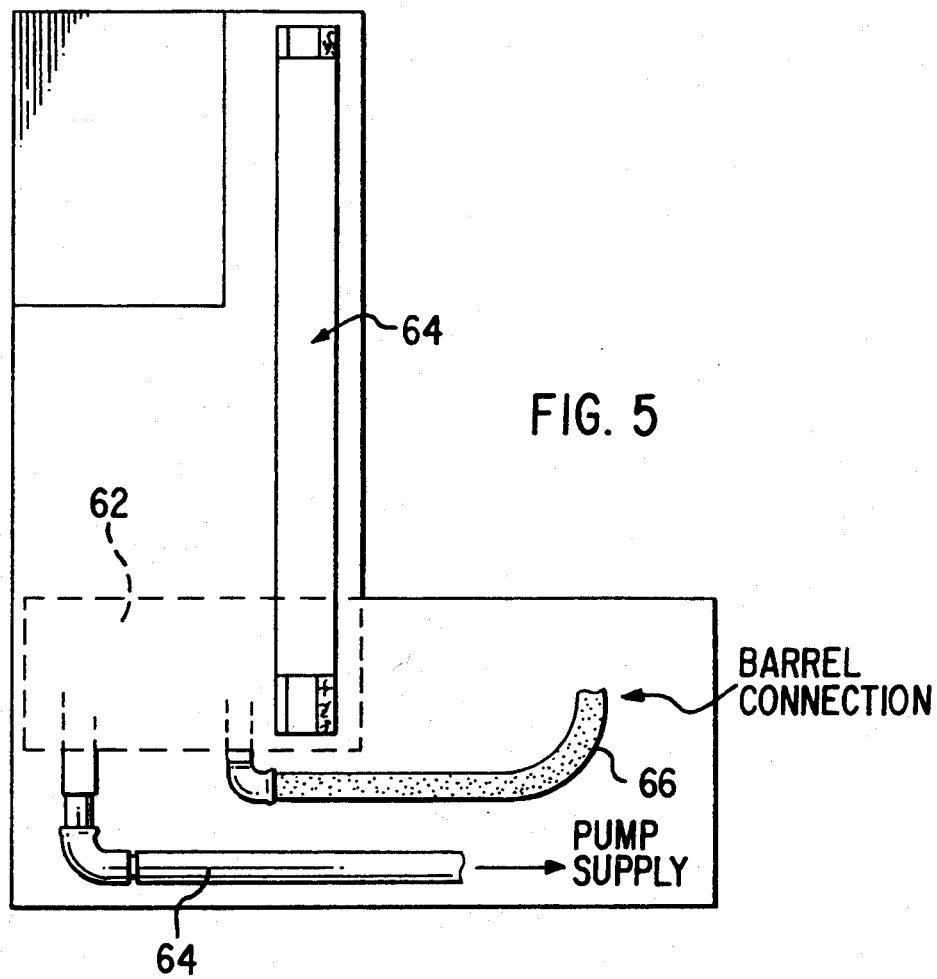
FIG. 5 shows a side elevation to an enlarged scale of the lubricant dispenser shown in FIG. 4.
Figure 6:
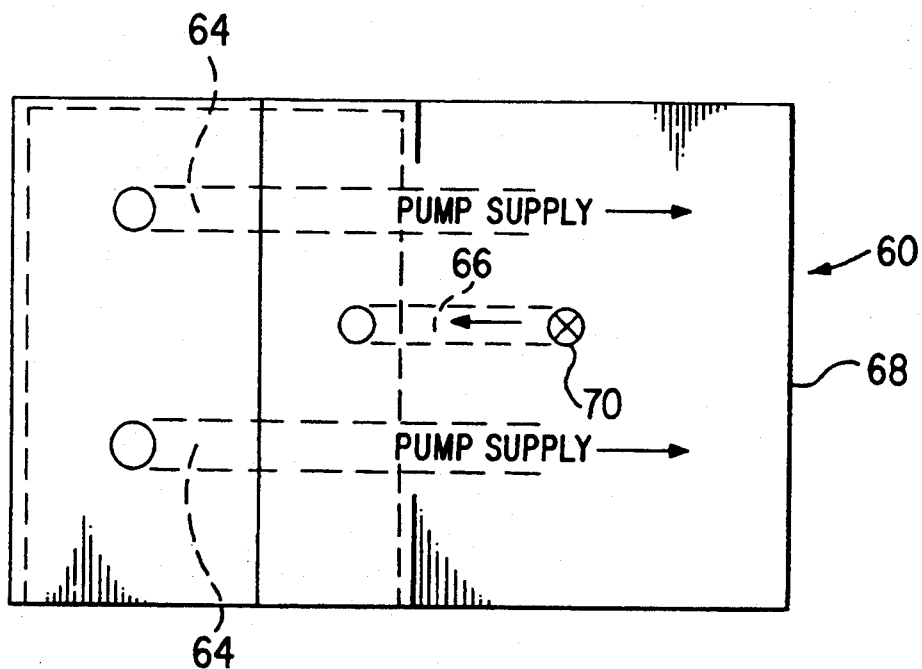
FIG. 6 shows a plan view of the lubricant dispenser shown in FIGS. 4 and 5.

In an alternative arrangement shown in FIGS. 4, 5 and 6 a lubricant dispenser (60) includes an integral reservoir (62) which has permanent connections to two pumps (not shown) located in the base of the dispenser (60) by means of pipes (64). The integral reservoir (62) is permanently attached to a sight level glass (64) and is connected to a lubricant barrel by a flexible hose (66).

The lubricant dispenser (60) is provided with a plate (68) having an opening (70). A lubricant barrel (61) is located on the plate (68) and has one part (63) of a two-part connector extending through the opening (70).

The flexible hose (66) is terminated by the other part (65) of the two-part connector so that the hose (66) can be attached to the lubricant barrel.

The connector which terminates the hose is of a larger diameter than the hole (70) in the plate (68). This arrangement ensures that the hose (66) can only be connected to the lubricant barrel when the connector on the barrel extends through the opening in the plate.

The lubricant level in the integral reservoir is always maintained above a pre-determined level to ensure that no air can enter the pump or pumps since lubricant will be continuously dispensed from the barrel which is attached to the hose (66).

Figure 7:
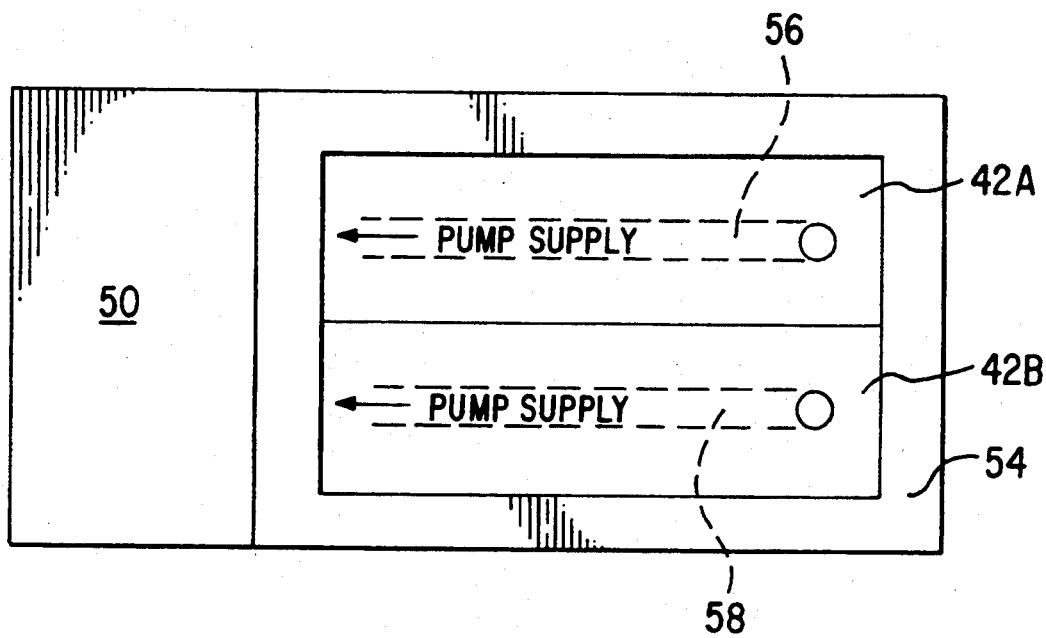
FIG. 7 shows a plan view of a modification to the lubricant dispenser shown in FIGS. 2 and 3.

The integral tank (42) can be divided into two sub-compartments (42A), (42B) as shown in FIG. 7, each sub-compartment being a volume approximately equal to a 40 gallon lubricant barrel. Each sub-compartment (42A), (42B) is permanently connected to a pump by tubing enabling different lubricants to be pumped from each sub-compartment, if required.

In both cases a separate internal level gauge can be provided for the sub-compartments so that the lubricant level in each subcompartment can be indicated.

Figure 8:
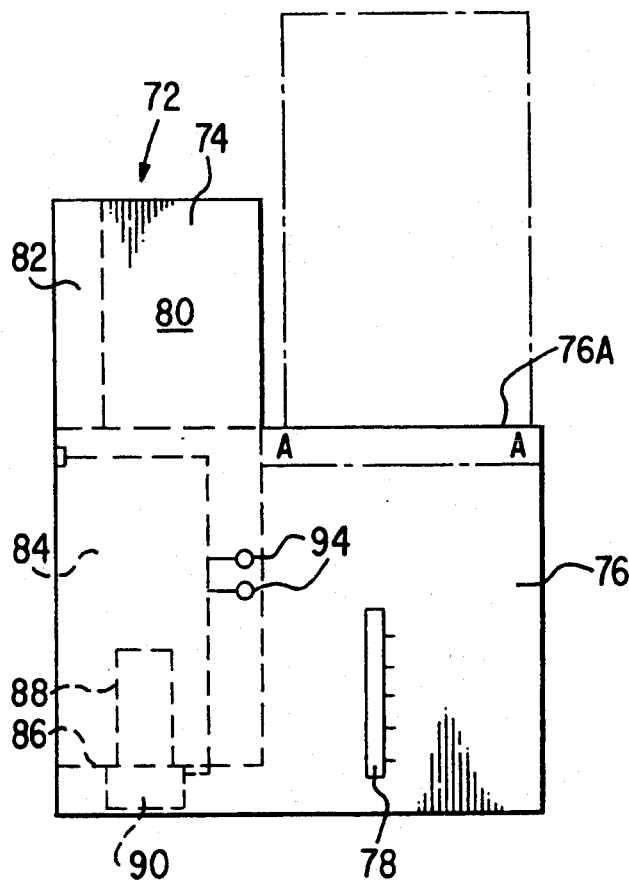
FIG. 8 shows a side elevation of a further form of lubricant dispenser according to the present invention.
Figure 9:
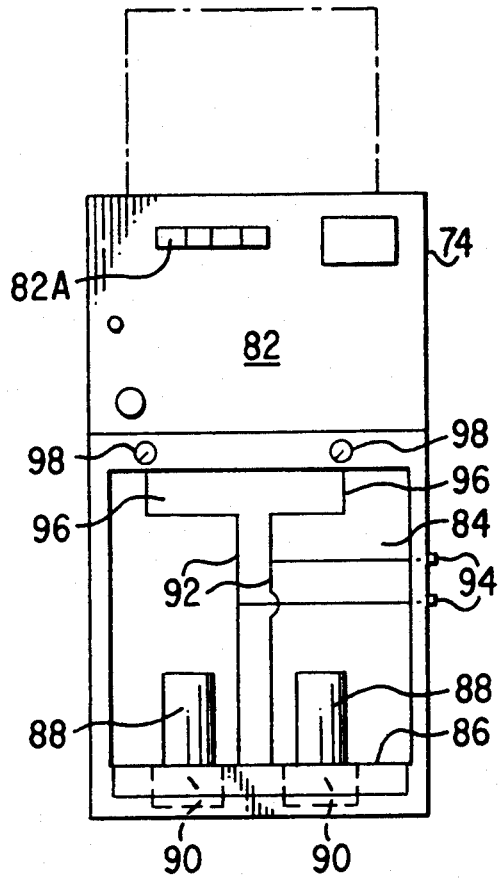
FIG. 9 shows a front elevation of the lubricant dispenser shown in FIG. 8.

The further form (72) of lubricant dispenser shown in FIGS. 7 and 8 comprises a housing (74), a tank (76) provided in the housing, a sight level gauge (78) on the side of the tank and control means (80) to which access is gained by a hinged panel (82). A standard 40 gallon barrel is shown supported on rim (76A) of the tank (76).

A rectangular recess (84) is provided in the housing (76) and has a floor (86) on which are mounted one or more electric motors (88), two being shown in this example. Each motor (88) drives a pump (90) which is mounted under the floor, and is permanently immersed in the lubricant to be dispensed, provided that the level in the tank (76) is kept sufficiently high. For example the line A—A indicates the level of lubricant when the tank is full. The tank can have a capacity of two or two and a half 40 gallon barrels. The sight level gauge (78) shows the level of lubricant in the tank, and lights (82A) on the panel (82) also indicate when the level is reaching a minimum desirable, indicating a fresh barrel of lubricant should be emptied into the tank.

Each pump has a discharge duct (92) terminating in a connector (94) attached to the side of the housing (74). Also each duct (92) has a tapping (96) to a pressure gauge (98) to indicate the delivery pressure pump.

Each pump can be controlled separately by the control means (80), so that whilst the pumps are both drawing lubricant from a common source, the delivery rates can be varied as requested.

More than two pumps and associated electric drive motors can be provided, and the pumps and drive motors can be varied in size as desired.

The pumps can be driven continuously by their respective motors, so that lubricant is supplied at a set flow-rate. Alternatively the motors can be driven in a step-wise manner so that lubricant is delivered in the form of "shots", that is precise quantities of lubricant at pre-determined intervals.

It will be appreciated that the lubrication dispenser described above can be used to supply lubricant to a number of locations simultaneously and on a continuous basis, such an arrangement effectively reduces the number of lubricant dispensers required if there are a number of spaced apart locations where tube or bar drawing operations are being performed. In the past it has been necessary to provide one lubricant dispenser for each tube or bar drawing operation. As the pump or pumps are permanently immersed in the lubricant to be dispensed there is no risk of air entering the pump which can cause serious damage by cavitation.

The filling process of the tank (76) can be aided by use of the valve shown in our co-pending UK patent application no. 9106251.3, the contents of which are hereby incorporated by way of reference.

In all cases the lubricant dispensers are provided with level indicators, for example a low level and an empty indicator lamp which are operated by a pressure switch, the pressure switch being operated by the pressure in a tube which extends into the lubricant.

It will be appreciated that lubricant dispensers according to the present invention ensure that the pump or pumps remain primed and air is prevented from entering the pump thereby minimising the risk of damage due to cavitation.

Also as the lubricant dispensers include reservoirs which are permanently connected to the pump or pumps and to sight level gauges either it is not necessary to make any connection between a lubricant barrel or where it is necessary in the case of the integral reservoir, the connection between the lubricant barrel and the supply hose to the internal reservoir has to be made without manoeuvring the lubricant barrel.

The lubricant dispensers can be operated continuously, since a fresh supply of lubricant can be provided without interrupting operations.

Whilst the present invention has been described with reference to supplying quantities of lubricant, dispensers according to the present invention can be used to deliver quantities of other pumpable materials either at a continuous rate, or at a step-wise manner.

I claim:

1. A lubricant dispenser for dispensing lubricants during the drawing of tubes or bars comprising a lubricant reservoir arranged to receive a supply of lubricant, pumping means having an inlet permanently connected to the lubricant reservoir, and control means for the pumping means, the pumping means being arranged to deliver predetermined quantities of lubricant under the control of the control means, the lubricant reservoir being an integral reservoir which is permanently connected to the pumping means and which is connectable to a lubricant container by a flexible hose and a two-part connector, one part of which is connected to the lubricant container and extends through an opening in a support of the dispenser, and the other part of which is attached to the hose, and which is of larger diameter than the opening in the support of the dispenser.

2. A dispenser as claimed in claim 1 in which the reservoir can be fed by gravity from a lubricant barrel supported in an inverted position on the lubricant dispenser.

3. A dispenser as claimed in either one of the preceding claims in which the reservoir is divided into at least two sub-compartments, each sub-compartment being permanently connected to a pump.

4. A lubricant dispenser as claimed in claim 1 including an internal level gauge which is permanently connected to the reservoir.

5. A dispenser as claimed in claim 1 including a pressure switch operated by lubricant pressure in a tube when lubricant level reaches a pre-determined level, the pressure switch operating an indicator light on a control panel.

6. A dispenser as claimed in claim 1 in which the reservoir is permanently connected to the pumping means by means of a flexible hose.

7. A dispenser as claimed in claim 1 in which the pumping means is permanently immersed in lubricant in the reservoir.

8. A dispenser as claimed in claim 1 in which the pumping means comprises a plurality of pumps, each pump having a separate discharge duct, and each pump is separately controllable by the control means.

9. A dispenser as claimed in claim 8 in which the pumps are of different capacities.

10. A dispenser as claimed in claim 9 in which at least one of the pumps comprises an electrically driven gear pump.

* * * * *